(12) United States Patent
Cho

(10) Patent No.: US 12,014,101 B2
(45) Date of Patent: Jun. 18, 2024

(54) DISPLAY CONTROL APPARATUS, VEHICLE HAVING THE SAME, AND METHOD FOR CONTROLLING DISPLAY

(71) Applicants: Hyundai Motor Company, Seoul (KR); Kia Corporation, Seoul (KR)

(72) Inventor: Yong Sik Cho, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/893,795

(22) Filed: Aug. 23, 2022

(65) Prior Publication Data

US 2023/0153051 A1 May 18, 2023

(30) Foreign Application Priority Data

Nov. 15, 2021 (KR) ........................ 10-2021-0156939

(51) Int. Cl.
| | |
|---|---|
| *G06F 3/14* | (2006.01) |
| *B60W 50/14* | (2020.01) |
| *B60K 35/00* | (2006.01) |
| *B60R 11/00* | (2006.01) |
| *B60R 11/02* | (2006.01) |
| *B60W 10/04* | (2006.01) |
| *B60W 10/20* | (2006.01) |
| *G06V 20/59* | (2022.01) |

(52) U.S. Cl.
CPC ........... *G06F 3/1423* (2013.01); *B60W 50/14* (2013.01); *B60K 35/00* (2013.01); *B60R 2011/0003* (2013.01); *B60R 2011/008* (2013.01); *B60R 11/0235* (2013.01); *B60W 10/04* (2013.01); *B60W 10/20* (2013.01); *B60W 2556/45* (2020.02); *G06V 20/59* (2022.01)

(58) Field of Classification Search
CPC .. B60W 10/04; B60W 10/20; B60W 2556/45; B60W 50/14; G06F 3/1423; G06V 20/59; G09G 2380/10; B60R 11/0235; B60R 2011/0003; B60R 2011/0005; B60R 2011/008; B60K 35/00
See application file for complete search history.

(56) References Cited

U.S. PATENT DOCUMENTS

| | | | |
|---|---|---|---|
| 8,807,621 B2 | 8/2014 | Stephan | |
| 9,373,302 B2 * | 6/2016 | Walker | G06F 3/0488 |
| 10,207,585 B2 * | 2/2019 | Oh | G06F 3/03548 |
| 10,297,225 B2 * | 5/2019 | Tamura | H04W 4/027 |
| 10,613,585 B2 * | 4/2020 | Park | G09G 3/003 |
| 10,696,162 B2 * | 6/2020 | Benchikhi | B60K 37/04 |
| 11,599,322 B1 * | 3/2023 | Johnson | G06F 3/038 |
| 2009/0213032 A1 * | 8/2009 | Newport | G06F 3/1454 |
| | | | 345/1.1 |

(Continued)

FOREIGN PATENT DOCUMENTS

KR 10-2019-0076101 A 7/2019

*Primary Examiner* — Kenneth Bukowski
(74) *Attorney, Agent, or Firm* — Fox Rothschild LLP

(57) ABSTRACT

Disclosed is a display control apparatus which may include a communication device, a display, and a processor electrically connected with the communication device and the display, wherein the processor outputs a first information through the display and outputs at least a part of the first information through an external device connected through the communication device when a specified event occurs while the first information is output.

17 Claims, 15 Drawing Sheets

(a)

(b)

(c)

(56) References Cited

U.S. PATENT DOCUMENTS

| | | | |
|---|---|---|---|
| 2014/0062688 A1* | 3/2014 | Aoki | B60R 1/12 |
| | | | 340/441 |
| 2014/0095000 A1* | 4/2014 | Waller | G06F 3/1454 |
| | | | 701/1 |
| 2016/0240169 A1* | 8/2016 | Tamura | G09G 5/006 |
| 2017/0192733 A1* | 7/2017 | Huang | G06F 3/1446 |
| 2020/0023860 A1* | 1/2020 | Lee | B60W 50/045 |

* cited by examiner (a)

(b)

(c)

(a)

(b)

(a)

(b)

(c)

DISPLAY CONTROL APPARATUS, VEHICLE HAVING THE SAME, AND METHOD FOR CONTROLLING DISPLAY

CROSS-REFERENCE TO RELATED APPLICATION

This application claims under 35 U.S.C. § 119(a) the benefit of Korean Patent Application No. 10-2021-0156939, filed on Nov. 15, 2021, the entire contents of which are incorporated herein by reference.

BACKGROUND

(a) Field

The present disclosure relates to a display control apparatus, a vehicle including the same, and a display control method, and more particularly, relates to a display control apparatus, a vehicle including the same, and a display control method that output a part of information output through a display through an external device.

(b) Description of Related Art

A display device capable of providing various information may be installed around the driver's seat of the vehicle. Such a display device may provide various information related to a route from the origin to the destination, a current position of a vehicle, and a condition of the vehicle (e.g., driving speed, fuel condition, tire pressure, or the like.), or may provide information for a user's convenience such as weather or news.

Recently, services (e.g., connected car services) that provide a more convenient driving environment through a convergence of vehicle functions with external devices such as smart phones, PDAs, or tablet Pcs are being provided. In general, to use a function of an external device while a vehicle is being driven, the external device is mounted around a dashboard, a center fascia, or a shift lever of the vehicle and used.

SUMMARY

However, a display device may be provided around the dashboard, the center fascia, or the shift lever of the vehicle, and in this case, at least a part of the display device may be covered by the mounted external device. Accordingly, a problem may occur in that a driver does not recognize information output through the display device.

An exemplary embodiment of the present disclosure is directed to provide a display control apparatus, a vehicle including the same, and a display control method that provide necessary information to a driver even if there is an external device that covers the front of a display.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a display control apparatus includes a communication device, a display, and a processor electrically connected with the communication device and the display, and the processor is configured to output a first information through the display, and is configured to output at least a part of the first information through an external device connected through the communication device when a specified event occurs while the first information is output.

According to various exemplary embodiments, the processor may be configured to identify an invisible area of the display covered by an external object and may be configured to transmit a part of the first information corresponding to the invisible area to the external device.

According to various exemplary embodiments, the processor may be configured to identify whether second information different from the first information is output by the external device before transmitting a part of the first information to the external device, and may be configured to transmit the part of the first information when the second information is not output.

According to various exemplary embodiments, the processor may be configured to identify a priority of the first information and the second information when the second information is output, and may be configured to transmit the part of the first information when the first information has a higher priority than the second information.

According to various exemplary embodiments, the processor may be configured to output a part other than the part of the first information through the display while the at least a part of the first information is output through the external device connected through the communication device.

According to various exemplary embodiments, the processor may be configured to limit an operation of the display or may operate in a low power mode while the at least a part of the first information is output through the external device connected through the communication device.

According to various exemplary embodiments, the processor may be configured to output third information different from the first information through the display while the at least a part of the first information is output through the external device connected through the communication device.

According to various exemplary embodiments, the display control apparatus may further include at least one sensor that senses an approach or a presence of an external object, and the processor may be configured to detect the occurrence of the specified event based on the at least one sensor.

According to various exemplary embodiments, the display control apparatus may further include at least one camera that obtains an image including the display, and the processor may be configured to detect the occurrence of the specified event by analyzing the image.

According to various exemplary embodiments, the display control apparatus may further include a cradle that can be mounted on the display, and the processor may be configured to detect the occurrence of the specified event based on a mounting position, a parallel movement, and a rotation state of the cradle.

According to an exemplary embodiment of the present disclosure, a vehicle includes a driving operation device, a vehicle driving device, a communication device, a display, and a vehicle control device electrically connected to the driving operation device, the vehicle driving device, the communication device, and the display, and that may be configured to control steering and driving of the vehicle, and the vehicle control device may be configured to output at least a part of first information output through the display through an external device connected through the communication device.

According to an exemplary embodiment of the present disclosure, a method of operating a display control apparatus includes outputting first information through a display, and outputting at least a part of the first information through an external device connected through communication when a specified event occurs while the first information is output.

According to various exemplary embodiments, the method of operating the display control apparatus may include identifying an invisible area of the display covered by an external object, and transmitting a part of the first information corresponding to the invisible area to the external device.

According to various exemplary embodiments, the method of operating the display control apparatus may include identifying whether second information different from the first information is output by the external device before transmitting a part of the first information to the external device, transmitting the part of the first information when the second information is not output, and identifying a priority of the first information and the second information when the second information is output, and transmitting the part of the first information when the first information has a higher priority than the second information.

According to various exemplary embodiments, the method of operating the display control apparatus may include outputting a part other than the part of the first information through the display while the at least the part of the first information is output through the external device.

According to various exemplary embodiments, the method of operating the display control apparatus may include limiting an operation of the display or to operate in a low power mode while the at least the part of the first information is output through the external device.

According to various exemplary embodiments, the method of operating the display control apparatus may include outputting third information different from the first information through the display while the at least the part of the first information is output through the external device.

According to various exemplary embodiments, the method of operating the display control apparatus may include detecting the occurrence of the specified event based on the at least one sensor configured to sense an approach or a presence of an external object.

According to various exemplary embodiments, the method of operating the display control apparatus may include obtaining an image including the display, and detecting the occurrence of the specified event by analyzing the image.

According to various exemplary embodiments, the method of operating the display control apparatus may include detecting mounting of a cradle to the display, and detecting the occurrence of the specified event based on a mounting position, a parallel movement, and a rotation state of the cradle.

BRIEF DESCRIPTION OF THE DRAWINGS

The above and other objects, features and advantages of the present disclosure will be more apparent from the following detailed description taken in conjunction with the accompanying drawings.

Figure 1:
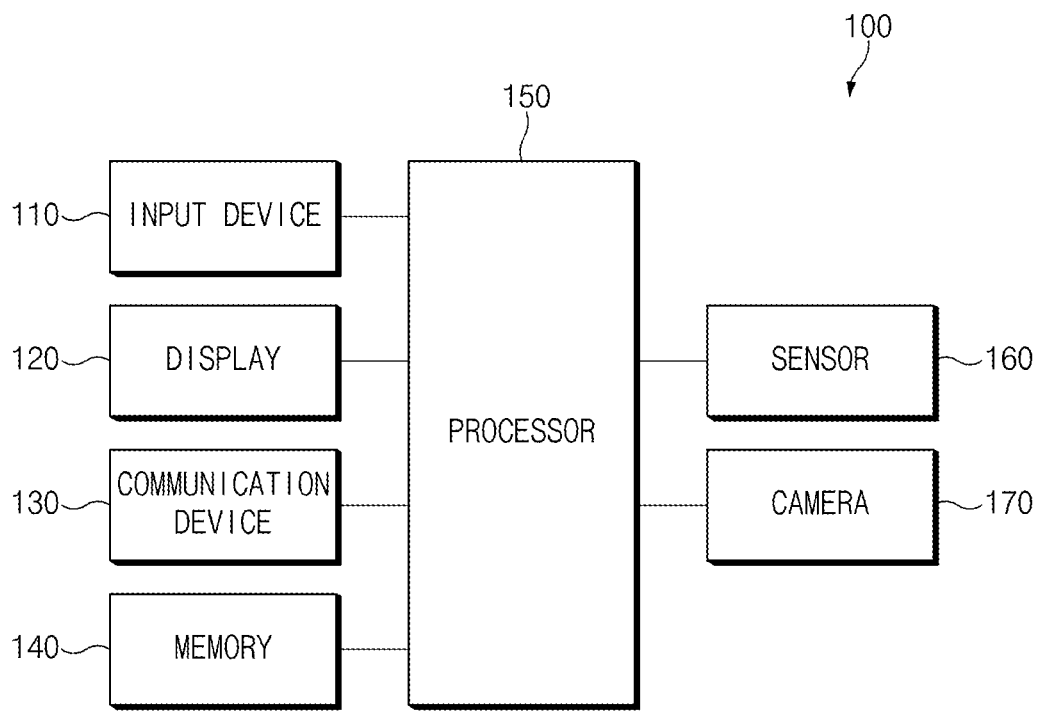
FIG. 1 is a block diagram illustrating a display control apparatus according to various exemplary embodiments of the present disclosure.

With regard to description of drawings, the same or similar components will be marked by the same or similar reference signs.

DETAILED DESCRIPTION

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, exemplary embodiments of the present disclosure will be described in detail with reference to FIGS. 1 to 11.

Figure 2:
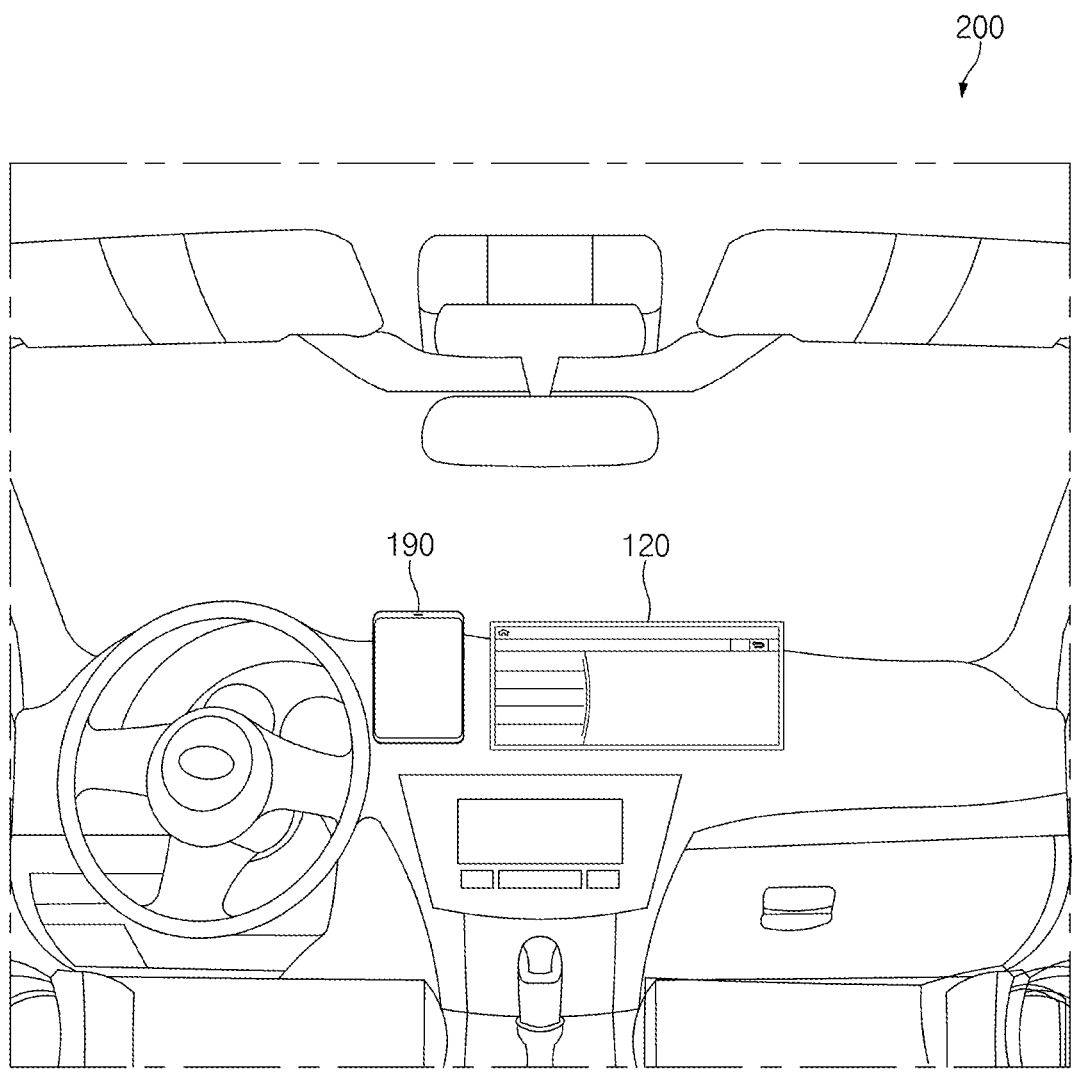
FIG. 2 is a diagram describing an inside of a vehicle on which an external device is mounted.
Figure 3A:
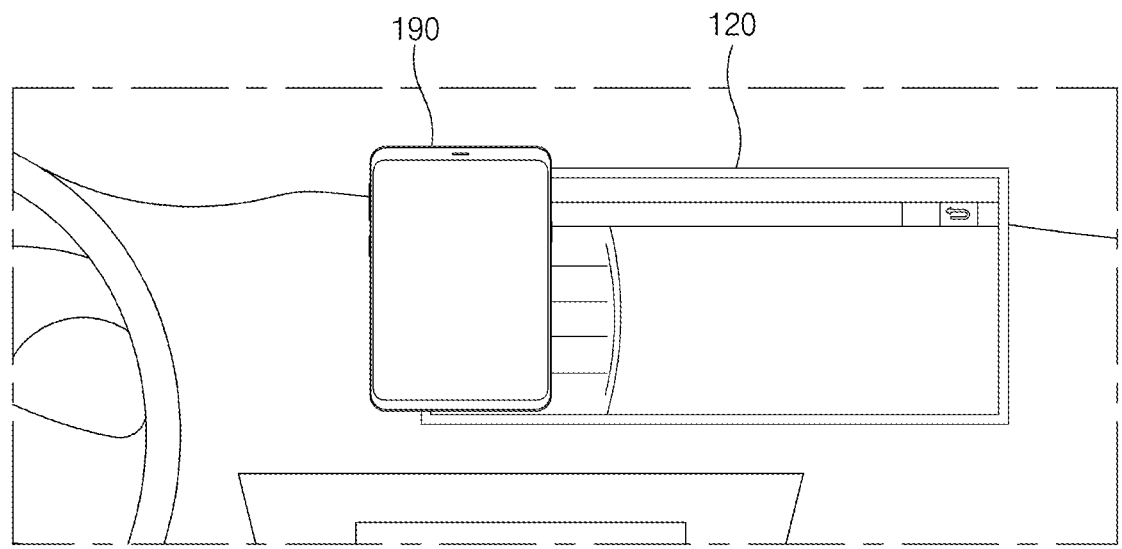
FIGS. 3A and 3B are diagrams describing how a par of information output through a display is output through an external device when a specified event occurs, according to various exemplary embodiments of the present disclosure.
Figure 3B:
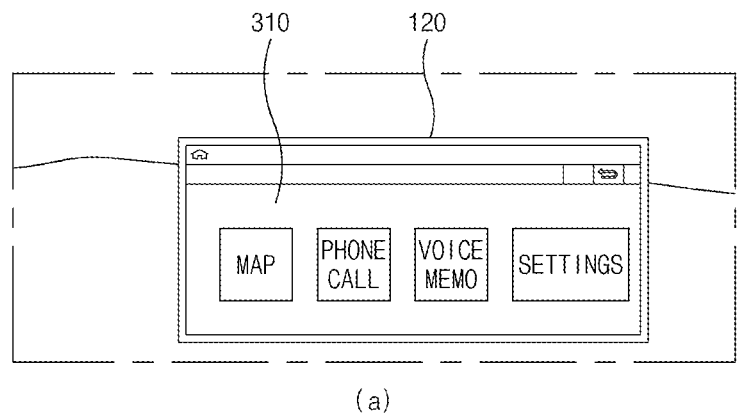
Figure 3B:
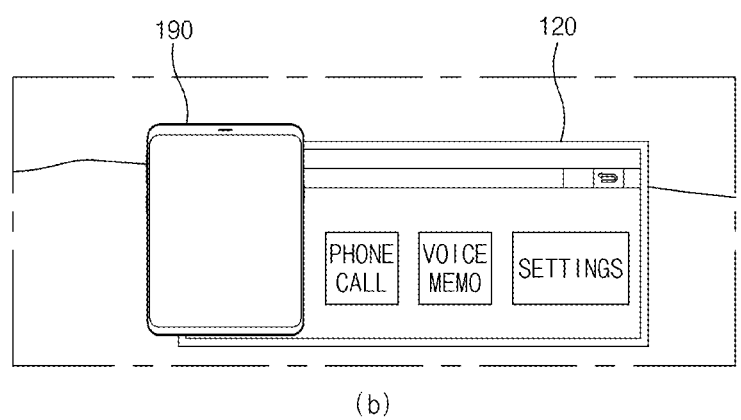
Figure 3B:
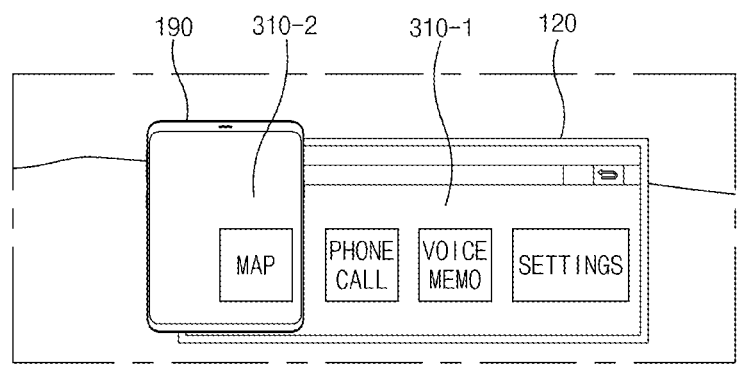
Figure 4A:
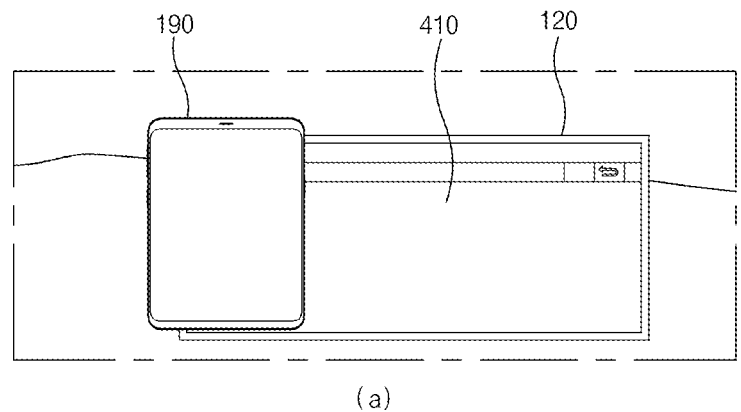
FIGS. 4A and 4B are diagrams describing how a part of information output through a display is output through an external device, according to various exemplary embodiments of the present disclosure.
Figure 4A:
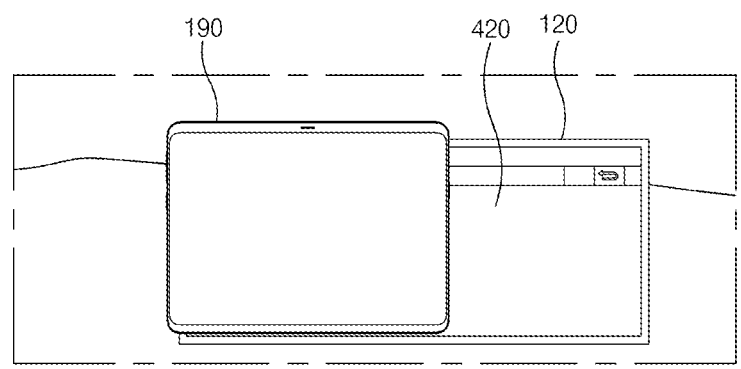
Figure 4B:
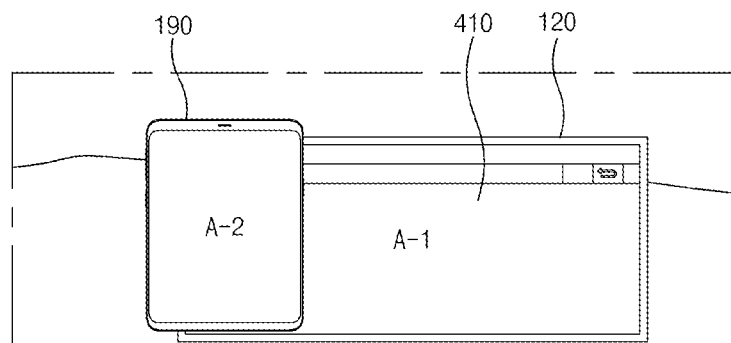
Figure 4B:
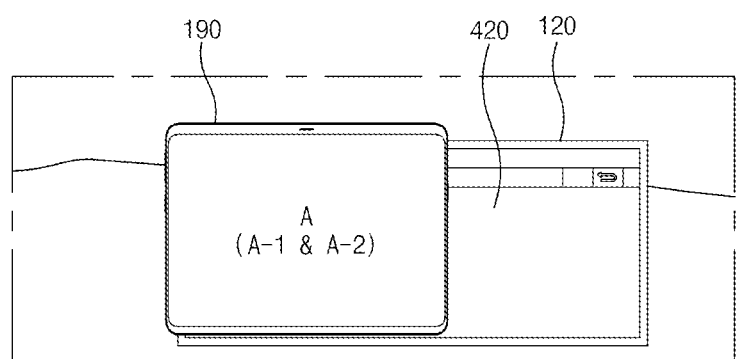
Figure 4B:
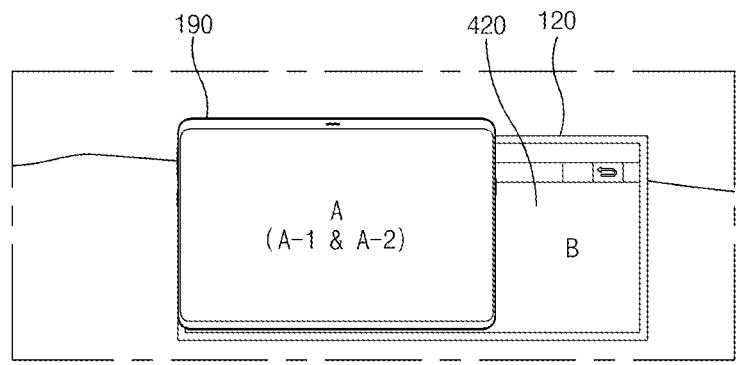

FIG. 1 is a block diagram illustrating a display control apparatus 100 according to various exemplary embodiments of the present disclosure. In addition, FIG. 2 is a diagram describing an inside of a vehicle 200 on which an external device 190 is mounted, and FIGS. 3A and 3B are diagrams describing how a part of information output through a display 120 is output through the external device 190 in response to an occurrence of a specified event. In addition, FIGS. 4A to 4B are diagrams describing how a part of information output through the display 120 is output through the external device 190, and FIGS. 5 to 7B are diagrams describing an occurrence of a specified event, according to various exemplary embodiments.

Referring to FIGS. 1 to 7B, the display control apparatus 100 according to various exemplary embodiments may include an input device 110, a display 120, a communication device 130, a memory 140, and a processor 150. However, this is only an example, and various exemplary embodiments are not limited thereto. For example, at least one (e.g., the input device 110) of the components of the above-described display control apparatus 100 may be omitted or one or more other components (e.g., a sensor 160, a camera 170, or the like.) may be added as a configuration of the display control apparatus 100.

According to various exemplary embodiments of the present disclosure, the input device 110 may be configured to receive a predetermined instruction or a command from an occupant (e.g., a driver and/or a passenger) in the vehicle 200. In addition, the input device 110 may be configured to generate an electrical signal corresponding to the received predetermined instruction or the received command and may transmit it to the processor 150. According to an exemplary embodiment, the input device 110 may include at least one of a hard key, a jog shuttle, and a touch pad. However, this is only an example, and the input device 110 may include various components capable of receiving a predetermined instruction or a command.

According to various exemplary embodiments, the display 120 may be configured to visually provide information related to an operation of the display control apparatus 100. The display 120 may include any one or more of a liquid crystal display, a thin film transistor-liquid crystal display, an organic light-emitting diode, a flexible display, and a three dimensional display (3D display), a transparent display, a head-up display, a touch screen, and a cluster. According to an exemplary embodiment, the display 120 may include a touch sensor configured to detect a touch.

According to various exemplary embodiments, the communication device 130 may support performing communication with the at least one external device 190. The at least one external device 190 may be an electronic device, such as a smart phone, a PDA, or a tablet PC, capable of transmitting and receiving data by communicating with the display control apparatus 100.

According to an exemplary embodiment, the communication device 130 may include at least one of a short-range communication device, a wired communication device, and a wireless communication device. For example, the short-range communication device may include various communication devices such as a Bluetooth module, an infrared communication device, a radio frequency identification (RFID) communication device, a wireless local access network (WLAN) communication device, an NFC communication device, a Zigbee communication device, or the like. For example, the wired communication device may include various communication devices such as a local area network module, a wide area network module, a value added network module, a universal serial bus (USB) module, a high definition multimedia interface (HDMI) module, an RS-232 (recommended standard 232) module, and the like. For example, the communication device 130 may include various communication devices such as, in addition to a Wi-Fi module and a wireless broadband module, global system for mobile communication (GSM), code division multiple access (CDMA), wideband code division multiple access (WCDMA), universal mobile telecommunications system (UMTS), time division multiple access (TDMA), long term evolution (LTE), 4G, 5G, or the like.

According to an exemplary embodiment, the communication device 130 may be configured to support a specified protocol that can be used for communication between components inside the vehicle 200. For example, a controller area network (CAN), a local interconnection network (LIN), a FlexRay, or the like may be used as the specified protocol.

According to various exemplary embodiments, the memory 140 may be configured to store commands or data related to at least one other component of the display control apparatus 100. According to an exemplary embodiment, the memory 140 may include programs, algorithms, routines, and/or instructions related to the operation (or control) of the display control apparatus 100. For example, the memory 140 may include at least one program module instructing each operation of the processor 150 mentioned in various exemplary embodiments of the present disclosure.

According to various exemplary embodiments, the processor 150 may be operatively connected to components (e.g., the input device 110, the display 120, the communication device 130, and the memory 140) and may be configured to perform overall operations of the display control apparatus 100.

According to an exemplary embodiment, the processor 150 may be configured to output first information through the display 120. The first information may be related to a function operated through the vehicle 200 and/or the external device 190. As at least some of the functions operated through the vehicle 200, an electronic map service, a vehicle status check function, a voice memo storage function, and the like may be included. In addition, at least some of the functions operated through the external device 190 may include a phone call function, a multimedia content playback function, and the like. For example, as illustrated in (a) of FIG. 3B, the first information including a menu 310 causing execution of at least one function (e.g., an electronic map, a phone call, a voice memo, a setting mode, or the like.) may be output through the display 120 of the vehicle 200.

According to an exemplary embodiment, the processor 150 may be configured to detect the occurrence of a specified event while outputting the first information. The specified event may be a situation in which the driver does not recognize at least a part of the first information output through the display 120.

For example, as illustrated in FIG. 3A, the specified event may include a situation in which at least a part of the display 120 is covered by the external device 190 in the vehicle 200. However, this is only an example, and various exemplary embodiments are not limited thereto. For example, in addition to the external device 190, a situation in which a driver's view on the display 120 is obstructed by other objects such as air fresheners or dolls may also be detected as the specified event. The detection of the specified event will be described later with reference to FIGS. 5 to 7B.

According to an exemplary embodiment when the occurrence of the specified event is detected, the processor 150 may be configured to control an output of the first information output through the display 120. Controlling the output of the first information may mean outputting a part of the first information that is covered with the external device 190 through the external device 190 (e.g., the display of the external device 190). By controlling the output of the first information, it is possible to solve the problem that the driver does not recognize at least a part of the first information that is covered with the external device 190.

For example, as illustrated in (b) of FIG. 3B, it may be assumed that at least a part (e.g., a menu that causes execution of the electronic map illustrated in (a) of FIG. 3A) of the first information is covered with the external device 190 in a state in which the first information composed of the menu 310 causing execution of a function operated through the vehicle 200 and/or the external device 190 is output through the display 120. In this case, the display 120 may be divided into a visible area that is not covered with the external device 190 and can be seen by the driver, and an invisible area that is not visible by the driver because it is covered with the external device 190. In this regard, the processor 150 may be configured to provide at least a part of the first information corresponding to the invisible area of the display 120 (e.g., information covered by the external device 190 and not recognized by the driver among the first information) to the at least one external device 190 connected through communication. Accordingly, as illustrated in (c) of FIG. 3B, at least a part 310-2 of the first information corresponding to the invisible area may be output through the external device 190, and at least a part 310-1 of the first information corresponding to the visible area may be output through the display 120. In this regard, the external device 190 may be configured to adjust an output position and/or an output size with respect to at least a part of the first information. For example, at least a part of the first information may be output a full screen or a partial screen (e.g., a pop-up screen, a split screen, or the like.). of the external device 190.

As described above, among the first information output through the display 120 of the vehicle 200, some information corresponding to the invisible area may be output through the external device 190. In this regard, the processor 150 according to various exemplary embodiments may be configured to determine an output method for the first information based on the size of the invisible area (or a degree of covering by the external device 190).

According to an exemplary embodiment, the output method for the first information may include a first mode for outputting the first information through the display 120 and the external device 190, and may include a second mode for outputting the first information only through the external device 190.

For example, when it is determined that the size of the invisible area covered by the external device 190 corresponds to a specified first level, the processor 150 may be configured to output the first information in a first output method. For example, when the size of the invisible area corresponds to the specified first level, as illustrated in (a) of FIG. 4A, less than a specified level of the display 120 is covered by the external device 190, and there is relatively many an uncovered part 410 of the display 120, so that the output of the first information may be possible. In this case, as illustrated in (a) of FIG. 4B, the processor 150 may be configured to output a part A-2 of first information 'A' corresponding to the invisible area through the external device 190, and may output the other part A-1 of the first information 'A' corresponding to the visible area through the uncovered part 410 of the display 120.

As another example, when it is determined that the size of the invisible area covered by the external device 190 corresponds to a specified second level, the processor 150 may be configured to output the first information in a second output method. For example, when the size of the invisible area corresponds to the specified second level, as illustrated in (b) of FIG. 4A, the display 120 is covered by the external device 190 by a specified level or more, relatively large external device 190 is mounted in the vehicle 200, or a plurality of external devices 190 are mounted in the vehicle 200, and uncovered part 420 of the display 120 is relatively small, so that the output of the first information may be actually impossible. In this case, as illustrated in (b) and (c) of FIG. 4B, the processor 150 may be configured to output all (A-1 and A-2) of the first information 'A' through the external device 190. In this regard, the processor 150 may be configured to limit an operation of the display 120 or may be configured to allow display 120 to operate in a low power mode while the first information is output through the external device 190. In this case, as illustrated in (b) of FIG. 4B, no information may be output through the uncovered part 420 of the display 120, and thus unnecessary power consumption may be prevented from occurring. As another example, as illustrated in (c) of FIG. 4B, the processor 150 may be configured to output predetermined information 'B' through the uncovered part 420 of the display 120 while the first information is output through the external device 190. The predetermined information 'B' may be information different from the first information that has been output (or currently output through the external device 190) through the display 120.

As described above, among the first information output through the display 120 of the vehicle 200, some information corresponding to the invisible area may be output through the external device 190 depending on an occurrence of the specified event.

According to an exemplary embodiment, the specified event may be generated by a driver's input. For example, when an input set to generate a specified instruction is detected, the processor 150 may output some information corresponding to the invisible area through the external device 190. The specified instruction may be an instruction for instructing to output information on the invisible area through the external device 190, and may be generated by at least one of a hard key input, a jog shuttle input, a touchpad input, or a voice input.

Figure 5:
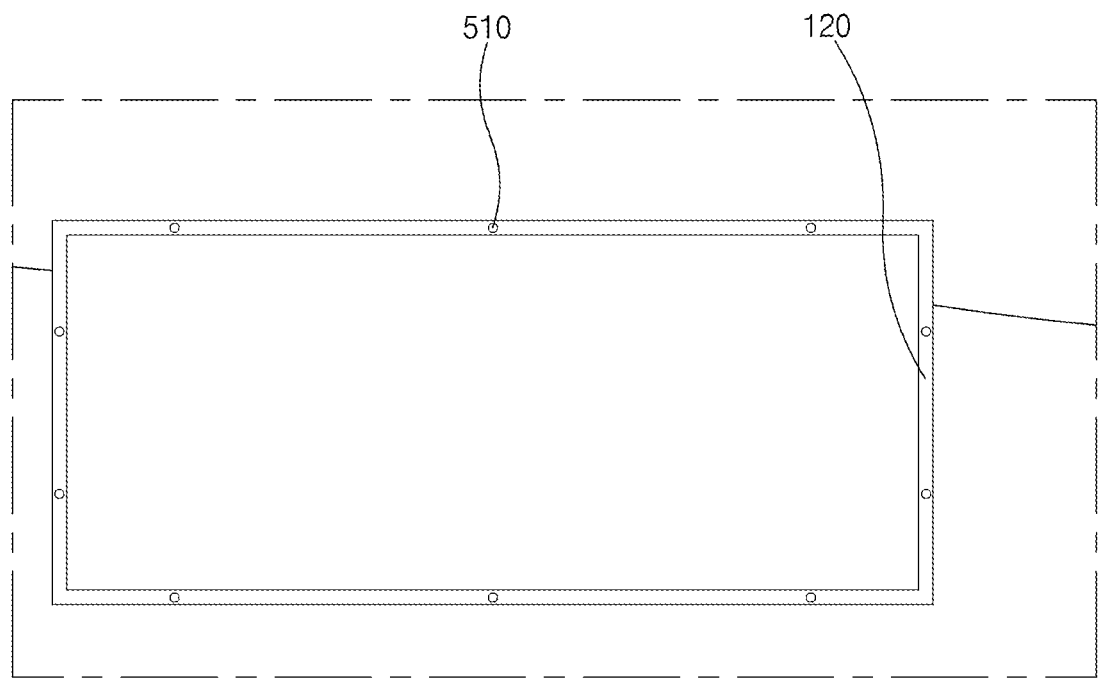
FIG. 5 is a diagram describing an occurrence of a specified event according to an exemplary embodiment.

According to an exemplary embodiment, the occurrence of the specified event may be related to detecting an approach or a presence of the external device 190. In this regard, the display control apparatus 100 may further include the sensor 160. For example, as illustrated in FIG. 5, the sensor 160 may include at least one sensor 510 disposed around the display area of the display 120, for example, along the edge of the display area. The at least one sensor 510 may be configured to irradiate predetermined light and to receive the light reflected from the object. However, this is only an example, and various exemplary embodiments are not limited thereto, and any sensor may be used as the configuration of the sensor 160 as long as it may detect the approach or presence of the external device 190.

For example, when the at least one sensor 510 detects the approach or presence of the external device 190, the processor 150 may be configured to output some information corresponding to the invisible area through the external device 190. In this regard, the processor 150 may be configured to determine the position, direction, and size of the invisible area based on the number of sensors and the position of the sensor that detects the approach or presence of the external device 190.

Figure 6A:
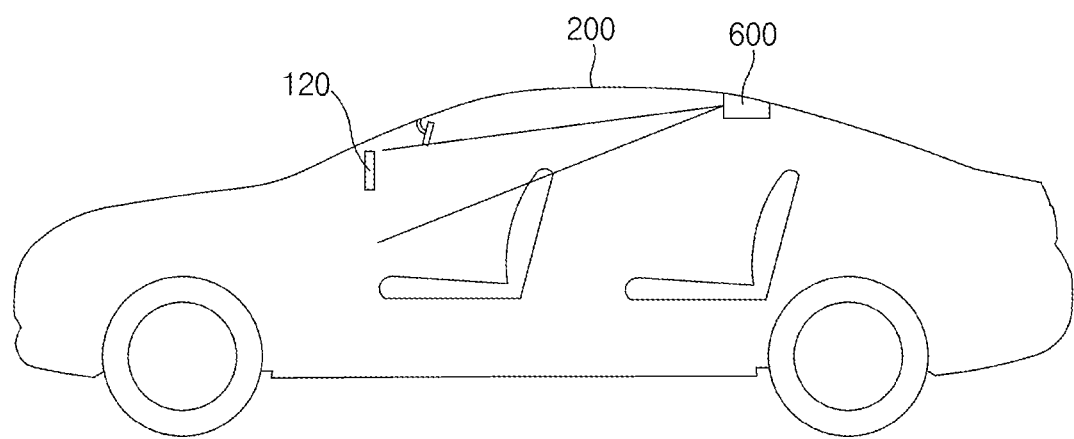
FIGS. 6A and 6B are diagrams describing an occurrence of a specified event according to another exemplary embodiment.

According to another embodiment, the occurrence of the specified event may be determined through an image analysis. In this regard, the display control apparatus 100 may include the at least one camera 170. For example, the at least one camera 170 may be provided in a head lining 600 that is built into the ceiling of the vehicle 200, as illustrated in FIG. 6A, and may have the angle of view capable of photographing the display 120. However, this is only an example, and various exemplary embodiments are not limited thereto. For example, the at least one camera 170 may be located at any position where an image including the display 120 can be captured, such as an overhead console, a center console, and the like, without limitation.

Figure 6B:
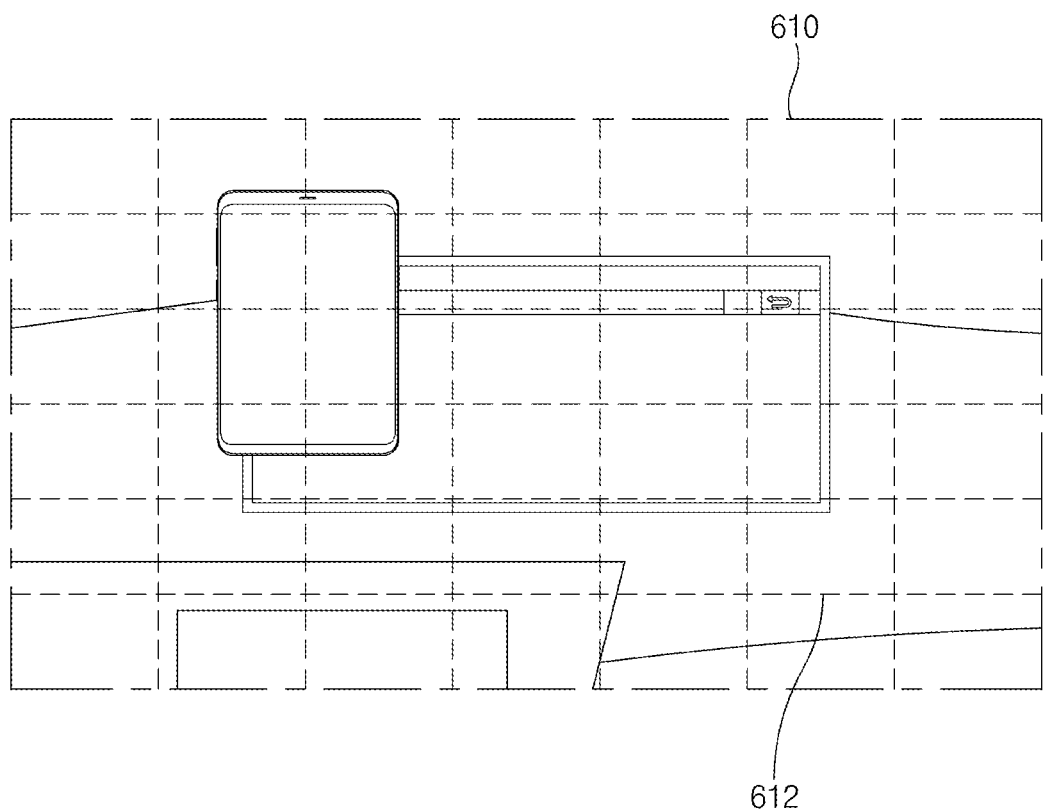

For example, as illustrated in FIG. 6B, the processor 150 may be configured to divide an image 610 acquired through the at least one camera 170 into a plurality of areas 612, and then may be configured to identify the invisible area of the display 120 covered by the external device 190. For example, the processor 150 may be configured to distinguish an area corresponding to the external device 190 and an area corresponding to the display 120 from the divided areas, and may be configured to identify the position, direction, size, and the like of the invisible area through the ratio thereof. However, this is only an example, and the invisible area may be identified using various known image analysis methods.

Figure 7A:
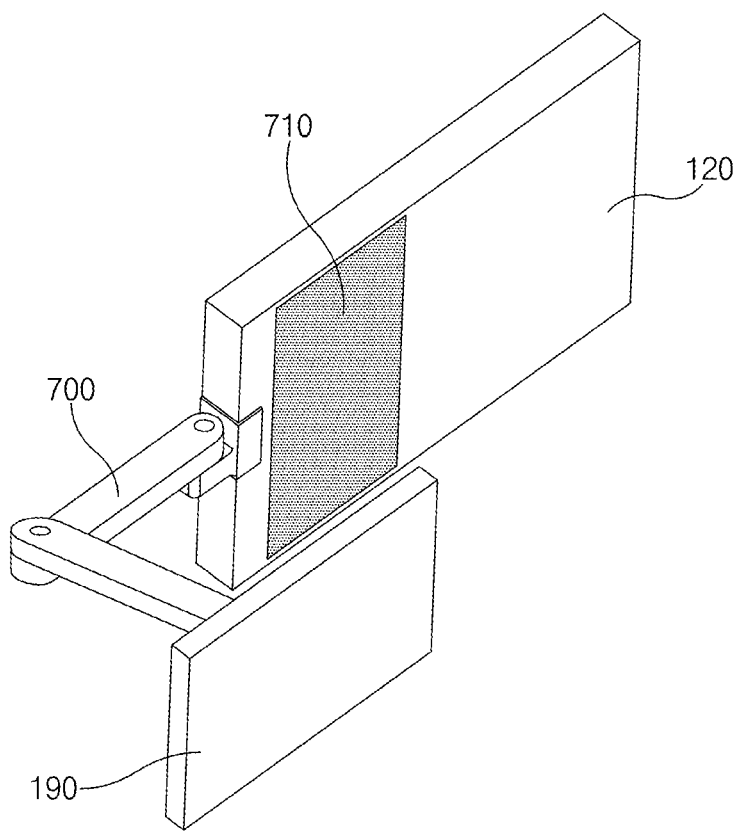
FIGS. 7A and 7B are diagrams describing an occurrence of a specified event according to another exemplary embodiment.
Figure 7B:
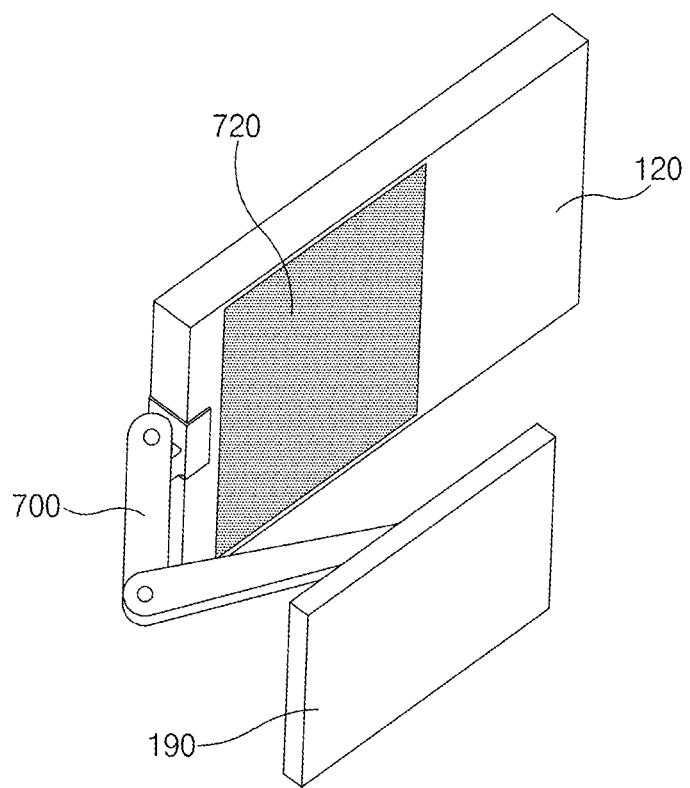

According to another embodiment, the specified event may be related to a state of mounting the external device 190. In this regard, the display control apparatus 100 may include at least one cradle 700 configured to be detachably attached to at least a part of the display 120 as illustrated in FIGS. 7A and 7B. For example, the cradle 700 may be an articulated holder that enables parallel movement and rotation and fixation at any angle up, down, left, and right with respect to the external device 190 in a mounted state. However, this is only an example, and various exemplary embodiments are not limited thereto. Also, the cradle 700 may be configured to provide state information related to parallel movement, rotation angle, and the like to the processor 150 through communication.

For example, the processor 150 may be configured to identify the invisible area of the display 120 covered by the external device 190 based on the state information obtained through the cradle 700. For example, the processor 150 may be configured to determine the position, direction, and size of the invisible area based on the state information of the cradle 700. As an example, as illustrated in FIG. 7A, when the first state of the cradle 700 is detected, the processor 150 may be configured to determine a first part 710 of the display 120 as the invisible area based on the mounting position of the cradle 700 (e.g., the center of the right side of the display 120). In addition, as illustrated in FIG. 7B, when the second state of the cradle 700 that has moved more in parallel than the first state is detected, the processor 150 may be configured to determine a second part 720 of the display 120 that is greater than the first part as the invisible area, based on the mounting position of the cradle 700.

Figure 8:
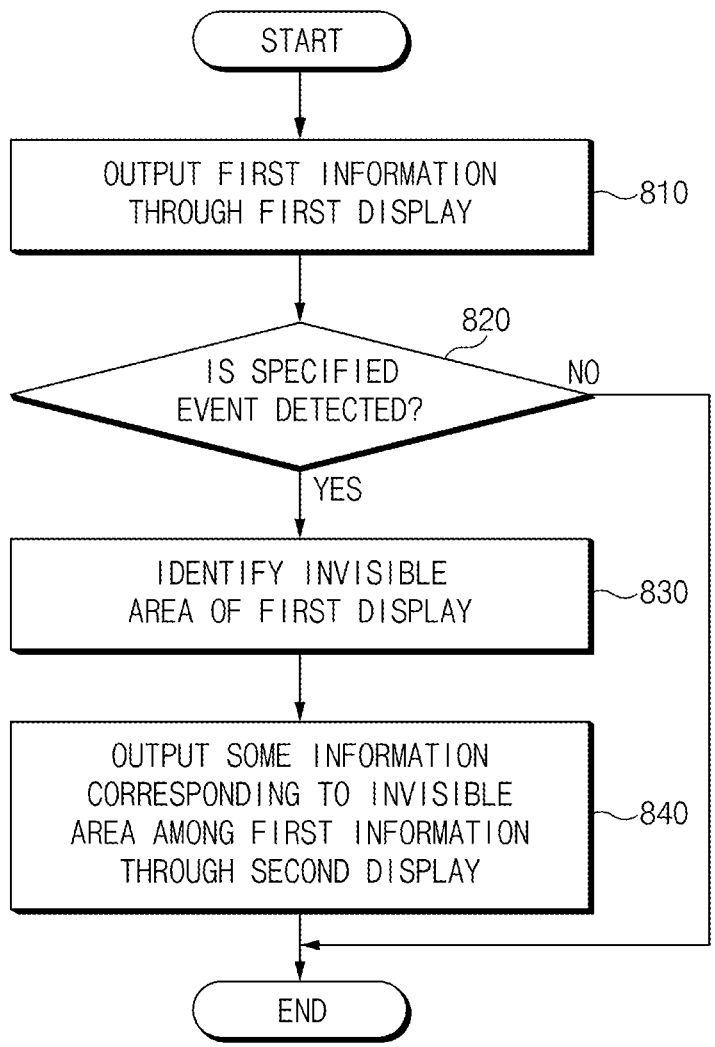
FIG. 8 is a diagram illustrating an operating method of a display control apparatus according to various exemplary embodiments.

FIG. 8 is a flowchart illustrating an operating method of the display control apparatus 100 according to various exemplary embodiments. Each operation in the following embodiments may be performed sequentially, but is not necessarily performed sequentially. For example, the order of each operation may be changed, and at least two operations may be performed in parallel. Also, at least one of the following operations may be omitted according to an exemplary embodiment.

Referring to FIG. 8, in operation 810, the display control apparatus 100 (or the processor 150) according to various exemplary embodiments may output the first information through a first display (e.g., the display 120). The first information may be related to a function operated through the vehicle 200 and/or the external device 190, as described above with reference to (a) of FIG. 3B.

According to various exemplary embodiments, the display control apparatus 100 (or the processor 150) may be configured to determine whether a specified event is detected in operation 820. The specified event may be a situation in which the driver does not recognize at least a part of the first information output through the first display. According to an exemplary embodiment, the display control apparatus 100 may be configured to determine whether a situation in which at least a part of the first display is covered by the external device 190 mounted in the vehicle 200 occurs. According to another exemplary embodiment, the display control apparatus 100 may be configured to determine whether an input set to generate a specified instruction is detected.

According to various exemplary embodiments, when the specified event is detected, the display control apparatus 100 (or the processor 150) may be configured to identify the invisible area of the first display in operation 830. The invisible area may be at least a part area of the first display that is covered by the external device 190 and cannot be seen by the driver. According to an exemplary embodiment, the display control apparatus 100, as described above with reference to FIGS. 5 to 7B, may be configured to identify the invisible area based on at least one of the information associated with the sensor 160, the image of the inside of the vehicle 200, and/or the state of the cradle 700.

According to various exemplary embodiments, in operation 840, the display control apparatus 100 (or the processor 150) may be configured to output some information corresponding to the invisible area among the first information through the second display. The second display may include a display provided in at least one external device 190 communicatively connected to the display control apparatus 100.

Figure 9:
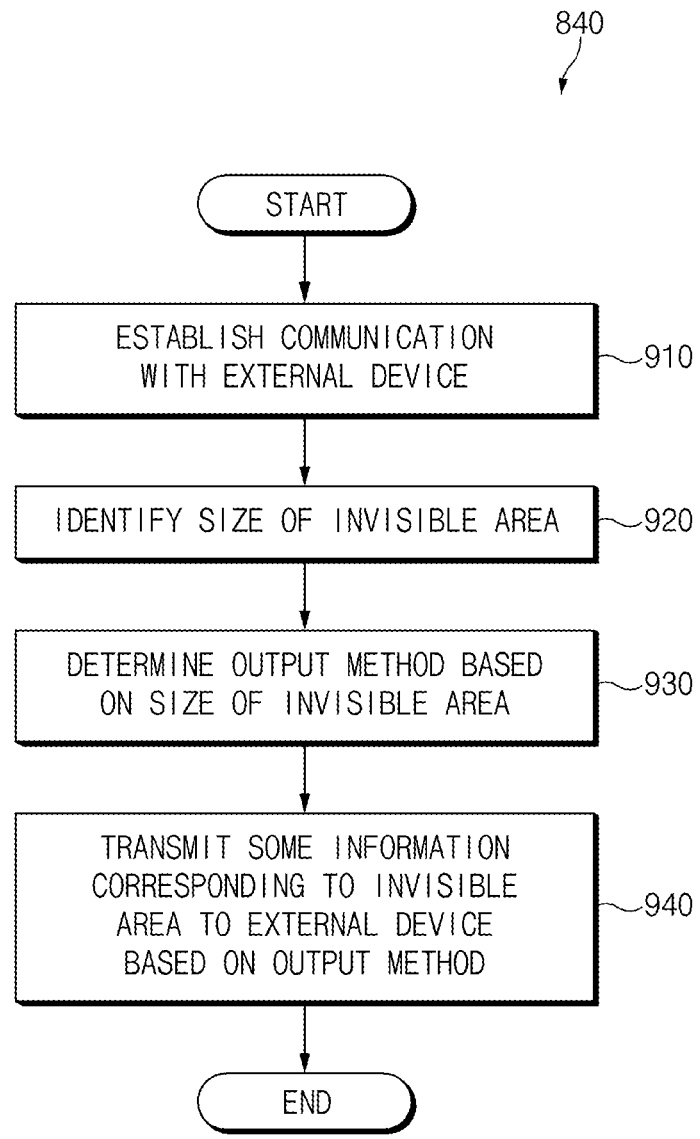
FIG. 9 is a flowchart illustrating an operation of outputting a part of first information through a second display in a display control apparatus according to various exemplary embodiments of the present disclosure.

FIG. 9 is a flowchart illustrating an operation of outputting a part of first information through a second display in the display control apparatus 100 according to various exemplary embodiments. The operations of FIG. 9 described below may represent various exemplary embodiments of operation 840 of FIG. 8. Each operation in the following embodiments may be performed sequentially, but is not necessarily performed sequentially. For example, the order of each operation may be changed, and at least two operations may be performed in parallel. Also, at least one of the following operations may be omitted according to an exemplary embodiment.

Referring to FIG. 9, the display control apparatus 100 (or the processor 150) according to various exemplary embodiments may establish communication with the external device 190 in operation 910. The external device may be an electronic device, such as a smart phone, a PDA, or a tablet PC, capable of transmitting and receiving data by communicating with the display control apparatus 100. According to an exemplary embodiment, the display control apparatus 100 may be configured to establish communication with the external device 190 based on wired or wireless communication.

According to various exemplary embodiments of the present disclosure, in operation 920, the display control apparatus 100 (or the processor 150) may identify the size of the invisible area with respect to a first display (e.g., the display 120). According to an exemplary embodiment, the display control apparatus 100 may be configured to identify the degree to which the first display is covered by the external device 190. For example, the display control apparatus 100, as described above with reference to FIGS. 5 to 7B, may be configured to identify the invisible area based on at least one of the information associated with the sensor 160, the image of the inside of the vehicle 200, and/or the state of the cradle 700.

According to various exemplary embodiments, in operation 930, the display control apparatus 100 (or the processor 150) may be configured to determine an output method for the first information based on the size of the invisible area. According to an exemplary embodiment, the output method may include a first mode for outputting the first information through the first display and the second display (e.g., the display of the external device 190), and a second mode for outputting the first information only through the second display.

According to various exemplary embodiments, in operation 940, the display control apparatus 100 (or the processor 150) may be configured to transmit some information corresponding to the invisible area to the external device 190 based on the determined output method. For example, when the output method of the first mode is determined, the display control apparatus 100 may be configured to transmit only a part of the first information to the external device 190 and may output the other part of the first information through the first display. In addition, when the output method of the second mode is determined, the display control apparatus 100 may be configured to transmit the entire first information to the external apparatus 190. Accordingly, at least a part of the first information corresponding to the invisible area may be output through the second display.

Figure 10:
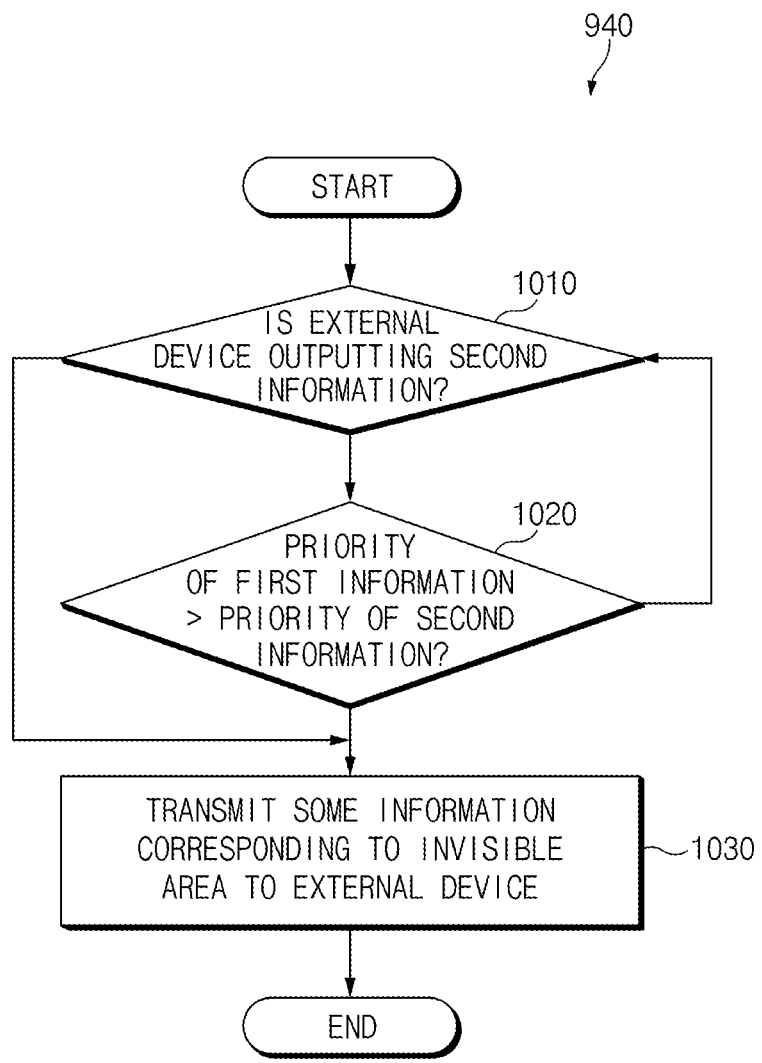
FIG. 10 is a flowchart illustrating an operation of transmitting a part of first information to an external device in a display control apparatus according to various exemplary embodiments of the present disclosure.

FIG. 10 is a flowchart illustrating an operation of transmitting some of the first information to the external device 190 in the display control apparatus 100 according to various exemplary embodiments. The operations of FIG. 10 described below may represent various exemplary embodiments of operation 940 of FIG. 9. Each operation in the following embodiments may be performed sequentially, but is not necessarily performed sequentially. For example, the order of each operation may be changed, and at least two operations may be performed in parallel. Also, at least one of the following operations may be omitted according to an exemplary embodiment.

Referring to FIG. 10, in operation 1010, the display control apparatus 100 (or the processor 150) according to various exemplary embodiments may determine whether the external device 190 is outputting second information. The second information may be information different from the first information. The second information may be related to a function operated through the external device 190. However, this is only an example, and various exemplary embodiments are not limited thereto. For example, the second information may relate to a function operated through the vehicle 200.

According to various exemplary embodiments, when the second information is output from the external device 190, in operation 1020, the display control apparatus 100 (or the processor 150) may compare the priority of the first information with the priority of the second information.

According to various exemplary embodiments, when the priority of the second information is greater than that of the first information, the display control apparatus 100 (or the processor 150) may determine whether the output of the second information is stopped. According to an exemplary embodiment, the display control apparatus 100 may perform a process such that the output of the second information having a high priority is not stopped due to the transmission of the first information.

According to various exemplary embodiments, when the priority of the first information is greater than that of the second information, in operation 1030, the display control apparatus 100 (or the processor 150) may be configured to transmit a part of information corresponding to the invisible area to the external device 190. Accordingly, the external device 190 may be configured to stop outputting the second information having a low priority and may output a part of the first information.

Figure 11:
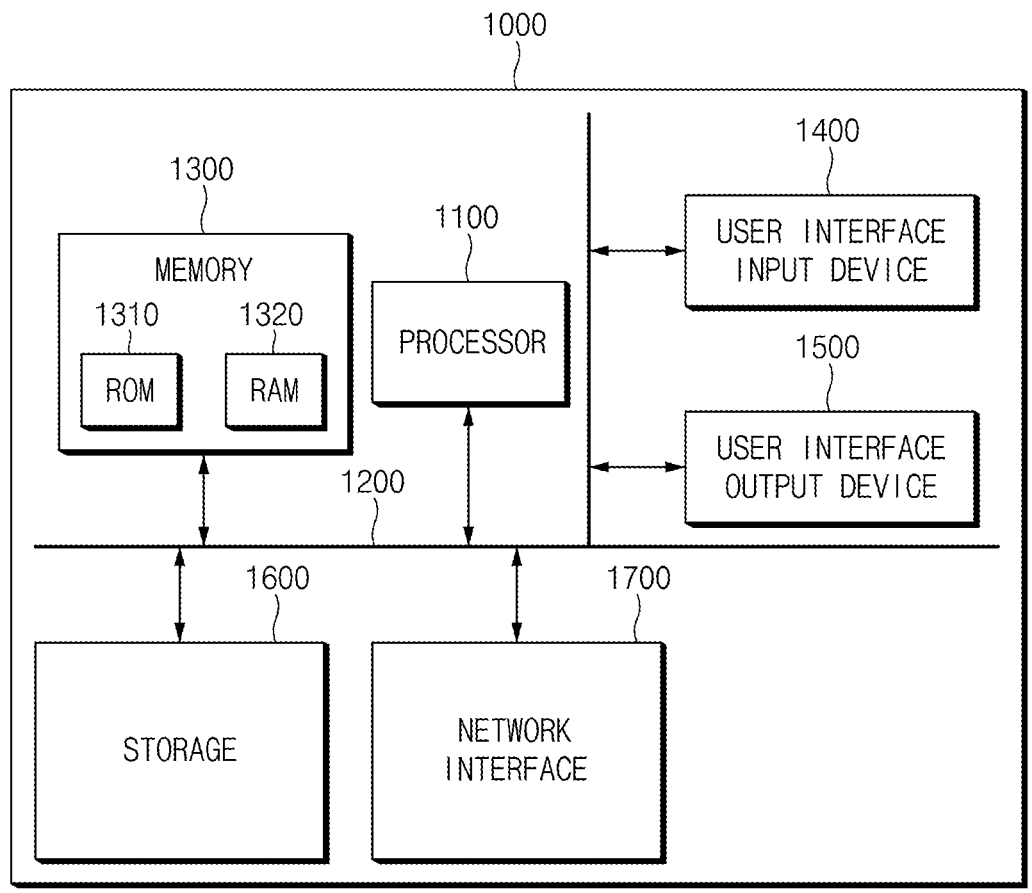
FIG. 11 is a diagram illustrating a configuration of a computing system executing a method according to an exemplary embodiment of the present disclosure.

FIG. 11 is a diagram illustrating a configuration of a computing system executing a method according to an exemplary embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may be configured to read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an exemplary embodiment of the present disclosure, the display control apparatus may be configured to effectively transmit necessary information to a driver even if the display is covered by an external device by allowing a part of the information output through the display to be output through the external device.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A display control apparatus comprising:
a communication device;
a display; and
a processor electrically connected with the communication device and the display,
wherein the processor is configured to:
output a first information through the display;
output at least a part of the first information through an external device connected through the communication device when a specified event occurs while the first information is output;
identify an invisible area of the display covered by an external object and transmit the part of the first information corresponding to the invisible area to the external device;
identify whether a second information different from the first information is output by the external device before transmitting the part of the first information to the external device; and
identify a priority of the first information and the second information when the second information is output, and transmit the at least a part of the first information when the first information has a higher priority than the second information.

2. The display control apparatus of claim 1, wherein the processor is further configured to transmit the part of the first information when the second information is not output.

3. The display control apparatus of claim 1, wherein the processor is further configured to output another part other than the part of the first information through the display while the part of the first information is output through the external device connected through the communication device.

4. The display control apparatus of claim 1, wherein the processor is further configured to limit an operation of the display or to operate in a low power mode while the part of the first information is output through the external device connected through the communication device.

5. The display control apparatus of claim 1, wherein the processor is further configured to output a third information different from the first information through the display while the part of the first information is output through the external device connected through the communication device.

6. The display control apparatus of claim 1, further comprising:
at least one sensor configured to sense an approach or a presence of the external object, and
wherein the processor is configured to detect the occurrence of the specified event based on the at least one sensor.

7. The display control apparatus of claim 1, further comprising:
at least one camera configured to obtain an image including the display,
wherein the processor is configured to detect the occurrence of the specified event by analyzing the image.

8. The display control apparatus of claim 1, further comprising:
a cradle configured to be mounted on the display,
wherein the processor is configured to detect the occurrence of the specified event based on a mounting position, a parallel movement, and a rotation state of the cradle.

9. A vehicle comprising:
a communication device;
a display; and
a display control apparatus electrically connected to the communication device+ and the display,
wherein the display control apparatus is configured to:
  output at least a part of a first information through the display through an external device connected through the communication device,
  identify an invisible area of the display covered by an external object and transmit the part of the first information corresponding to the invisible area to the external device;
  identify whether a second information different from the first information is output by the external device before transmitting the part of the first information to the external device; and
  identify a priority of the first information and the second information when the second information is output, and transmit the at least a part of the first information when the first information has a higher priority than the second information.

10. A method of operating a display control apparatus, the method comprising:
  outputting at least a part of a first information through a display;
  outputting the part of the first information through an external device connected through communication when a specified event occurs while the first information is output;
  identifying an invisible area of the display covered by an external object;
  transmitting the part of the first information corresponding to the invisible area to the external device;
  identifying whether a second information different from the first information is output by the external device before transmitting the part of the first information to the external device;
  identifying a priority of the first information and the second information when the second information is output, and
  transmitting the part of the first information when the first information has a higher priority than the second information.

11. The method of claim 10, further comprising:
transmitting the part of the first information when the second information is not output.

12. The method of claim 10, further comprising:
outputting another part other than the part of the first information through the display while the part of the first information is output through the external device.

13. The method of claim 10, further comprising:
limiting an operation of the display or operating in a low power mode while the part of the first information is output through the external device.

14. The method of claim 10, further comprising:
outputting a third information different from the first information through the display while the part of the first information is output through the external device.

15. The method of claim 10, further comprising:
detecting the occurrence of the specified event based on the at least one sensor configured to sense an approach or a presence of the external object.

16. The method of claim 10, further comprising:
obtaining an image including the display; and
detecting the occurrence of the specified event by analyzing the image.

17. The method of claim 10, further comprising:
detecting mounting of a cradle to the display; and
detecting the occurrence of the specified event based on a mounting position, a parallel movement, and a rotation state of the cradle.

* * * * *